US008949465B2

(12) United States Patent
Hunt et al.

(10) Patent No.: US 8,949,465 B2
(45) Date of Patent: Feb. 3, 2015

(54) INTERNATIONALIZATION WITH VIRTUAL STAGING AND VERSIONING

(75) Inventors: Neil D. Hunt, Los Altos, CA (US); Stephan G. Betz, Soquel, CA (US)

(73) Assignee: Netflix, Inc., Los Gatos, CA (US)

( * ) Notice: Subject to any disclaimer, the term of this patent is extended or adjusted under 35 U.S.C. 154(b) by 678 days.

(21) Appl. No.: 13/219,134

(22) Filed: Aug. 26, 2011

(65) Prior Publication Data

US 2013/0054736 A1 Feb. 28, 2013

(51) Int. Cl.
*G06F 15/16* (2006.01)
*G06F 9/44* (2006.01)

(52) U.S. Cl.
CPC .................................... *G06F 9/4448* (2013.01)
USPC ............................. 709/246; 709/203; 709/219

(58) Field of Classification Search
CPC ...................................................... G06F 9/4448
USPC ........................................ 709/246, 203, 219
See application file for complete search history.

(56) References Cited

U.S. PATENT DOCUMENTS

| 6,704,776 B1 * | 3/2004 | Fortune ......................... 709/219 |
| 2002/0156688 A1 | 10/2002 | Horn et al. |
| 2002/0184610 A1 | 12/2002 | Chong et al. |
| 2006/0150173 A1 | 7/2006 | McHugh et al. |

OTHER PUBLICATIONS

International Search Report PCT/US12/052374 dated Nov. 2, 2012.

* cited by examiner

*Primary Examiner* — David Lazaro
(74) *Attorney, Agent, or Firm* — Patterson & Sheridan, LLP

(57) ABSTRACT

One embodiment of the present invention sets forth a technique for providing a variation of digital content that is based on a client-specified context token. Localized digital assets, e.g., graphics resources, video resource, audio resources, and text string resources, are stored as a collection of records and are dynamically linked to a assemble a software system based on the client-specified context token to generate the variation of digital content. The client receives the assembled variation of the digital content including the localized digital assets specified by the client-provided context.

21 Claims, 6 Drawing Sheets

INTERNATIONALIZATION WITH VIRTUAL STAGING AND VERSIONING

BACKGROUND OF THE INVENTION

1. Field of the Invention

Embodiments of the invention generally relate to consumer electronics devices. More specifically, embodiments of the invention relate to techniques for using a dynamic database to perform internationalization with virtual staging and versioning.

2. Description of the Related Art

International websites and web services generally segment localizable string resources to facilitate localization. The localizable string resources include text strings and symbols that vary for different languages and locales, e.g., monetary symbols and words. Conventional systems manage the string resources in a software build system. Files containing the string resources are exported from a source code repository for translation by human translators. The human translators operate independently from the source code repository and the translations of the exported string resources are re-imported into the source code repository. A new build of the system is performed to integrate the translated string resources into the source code.

The new build is then staged onto test or quality assurance servers for evaluation before being released for use on the international websites or web services. Modifications to the translations necessitated by the test process are integrated into the system and a new build is performed. Managing versioning of the different system builds and the approval status of the resource strings is complex and error prone.

Improved techniques are needed to simplify the management of different system build versions and to enable tracking of the approval status of translated resource strings. Additionally, the ability to access different variations of a software system is desired.

SUMMARY OF THE INVENTION

One embodiment of the present invention includes a method for assembling digital content. The method may generally include receiving a context token and a client device identifier and extracting an assembly rule specifying a localized digital asset, from the context token. Based on the assembly rule, the localized digital asset is located in a dynamic database. A variation of the digital content is assembled that instantiates the localized digital asset in the variation of the digital content. The variation of the digital content is transmitted to a client device associated with the client device identifier.

One advantage of an embodiment of the disclosed method is that the system software may be accessed by different clients and that each client may control the assembly of localized digital asset provided via the system software to the client by specifying a context token. The context token represents a virtual staging level of the software system by allowing specification of one or more of a particular digital localized asset identifiers, locale identifiers, and approval status. A human translator may be provided with a view of the localized digital asset that is assembled based on a context token specified by the translator and that particular software system may be used to view a translated string resource.

Another advantage of the disclosed method is that different versions of the software system may share the same database of localized digital assets, so that translation and localization work performed in one (perhaps older) version of the software system can be immediately viewed and accessed within a different (perhaps newer) version of the software system without needing a new build.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for providing a variation of digital content that is based on a client-specified context token. Localized digital assets, e.g., graphics resources, video resource, audio resources, and text string resources, are stored as a collection of records and are dynamically assembled in a software system by a dynamic context-based assembler based on the client-specified context token to generate the variation of digital content. The client receives the assembled variation of the digital content including the localized digital assets specified by the client-provided context.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a client device that is configured to perform software development or quality assurance operations using a variation of the software system. The client device may be a computing device or a consumer electronics device. However, it should be understood that the invention may be adapted to provide particular variations of digital content, e.g., music, television programming, etc., to consumer electronics devices over a data communications network. Example consumer electronics devices include disc players, set-top boxes, mobile telephones, game platforms, portable music players, home media systems, and the like.

Figure 1:
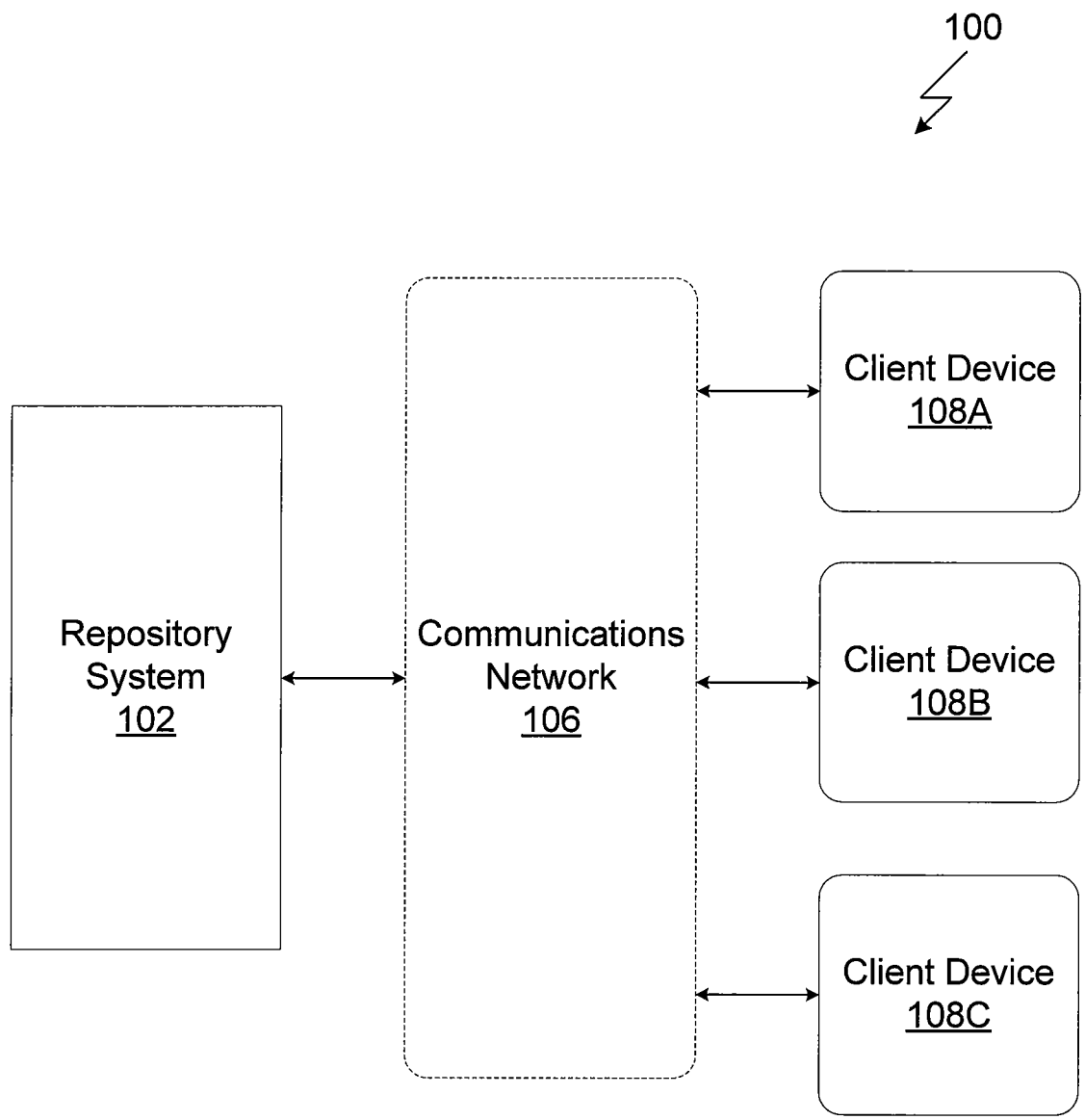
FIG. 1 illustrates a computing infrastructure configured to provide dynamic storage of localized digital assets, according to one embodiment of the invention.

FIG. 1 illustrates a computing infrastructure 100 configured to provide dynamic storage of localized digital assets, according to one embodiment of the invention. As shown, the computing infrastructure includes a repository system 102 and a plurality of client devices 108A, 108B, and 108C, each connected to a communications network 106.

Illustratively, each of the client devices 108A, 108B, and 108C communicates with the repository system 102 over the network 106 to download variations of a software system. Of course, other approaches may be used to allow the client devices 108A, 108B, and 108C to receive a software system dynamically from the repository system 102. In this example, client devices 108A, 108B, and 108C include a client device 108A that is configured for software development, a client device 108B that is configured for quality assurance to test variations of the software system, and a client device 108C that is configured as a consumer device, such as a consumer electronic device. For example, the client device 108C may include a player component capable of executing an Adobe Flash® file, Microsoft® Silverlight® package, a BrightScript application, or an HTML5 object. The client devices 108A and 108B are typically computing devices and client device 108A may be configured for use by a human translator to translate a digital asset and generate a localized digital asset.

The repository system 102 includes a dynamic context-based assembler and a collection of localized digital assets. As described in greater detail below, the dynamic context-based assembler receives a context token from a client device 108A, 108B, or 108C and assembles a variation of a version of digital content based on the context token. Localized digital assets generated by human translators are transmitted from the client device 108A and stored in the repository system 102 for use in generating variations of digital content.

Figure 2:
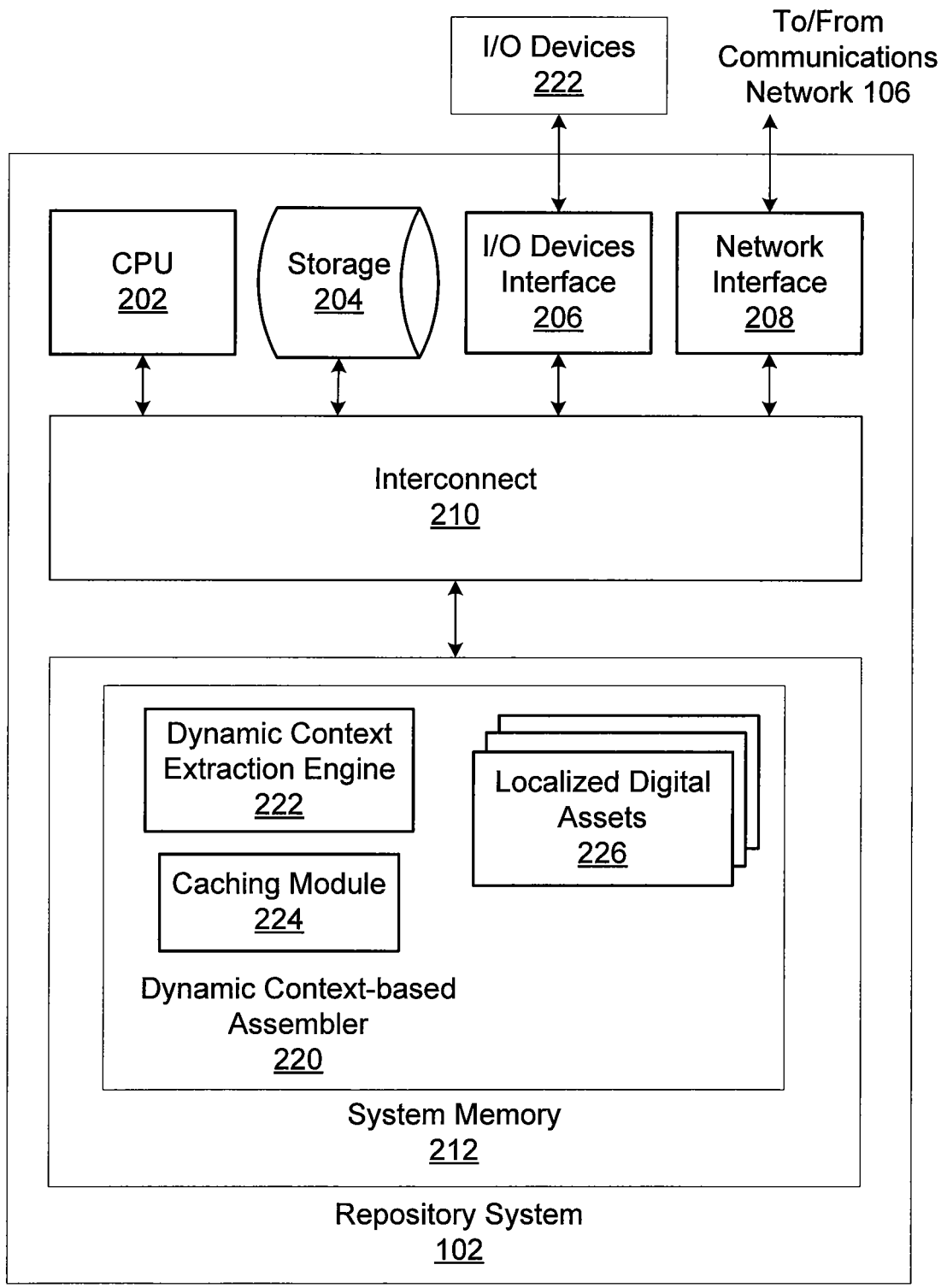
FIG. 2 is a more detailed view of the repository system of FIG. 1, according to one embodiment of the invention.

FIG. 2 is a more detailed view of the repository system 102 of FIG. 1, according to one embodiment of the invention. As shown, the repository system 102 includes, without limitation, a central processing unit (CPU) 202, a network interface 215, an interconnect 210, and a system memory 212. The CPU 202 retrieves and executes programming instructions stored in the system memory 212. Similarly, the CPU 202 stores and retrieves application data residing in the system memory 212. The interconnect 210 facilitates transmission, such as of programming instructions and application data, between the CPU 202, input/output (I/O) devices interface 222, storage 204, network interface 208, and system memory 212. The I/O devices interface 222 is configured to receive input data from user I/O devices. Examples of user I/O devices may include one of more buttons, a keyboard, and a mouse or other pointing device. The I/O device interface 222 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The network interface 208 is configured to transmit data via the communications network 106, e.g., to transmit context tokens and localized digital assets 226 from the client devices 108A, 108B, and 108C, as well as to return a assembled variation of digital content generated by the dynamic context-based assembler 220 to the client devices 108A, 108B, and 108C.

CPU 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN).

The system memory 212 stores a dynamic context-based assembler 220 that is configured to assemble a variation of digital content based on a context token and client identifier received via the communications network 106. The client identifier may differentiate between versions of the digital content designated for particular purposes, e.g., development, translation, and quality assurance, or the client identifier may differentiate between users having specific access privileges. In one embodiment, the dynamic context-based assembler 220 composes particular digital content based only on the client identifier. For example, a configuration set may be assigned and stored in the dynamic context-based assembler 220 for a particular computing system, user, or test account. Alternatively, the dynamic context-based assembler 220 may be configured to compose digital content based on a combination of the client identifier and the context token or based only on the context token.

The dynamic context-based assembler 220 accesses a database of localized digital assets 226 that may be stored in storage 204, and/or may be cached in system memory 212. In addition to translations to different languages and particular locales, e.g., Quebec or France, the localized digital assets 226 include variants of user interface elements such as a layout of major components of a user interface (e.g., the placement of information using rows or columns of choices), the colors or sizes of fonts, or the text on buttons, menus, and descriptions or instructions. The dynamic context-based assembler 220 also includes a dynamic context extraction engine 222 and a caching module 224. The dynamic context extraction engine 22 is configured to extract information from the context token, to locate localized digital assets specified by the context token, and to locate digital assets that will be replaced with the specified localized digital assets in a hierarchy of digital assets. The hierarchy of digital assets is a tree structure that links each digital asset into a digital content structure. The caching module 224 temporarily stores variations of the digital content assembled by the dynamic context-based assembler 220 to improve access time for clients requesting a recently generated version of digital content.

Different versions of the source code may be built into similar systems 102 that all share the same repository of digital content. For example, there may be a release version that is suitable for consumers to access, a quality assurance (QA) version that is under test prior to release, a development version that is stable for software development, and the like. All share the same digital content, but may extract different subsets of the digital content according to the context token and client identifier to populate new or changed features of the different software systems.

Figure 3A:
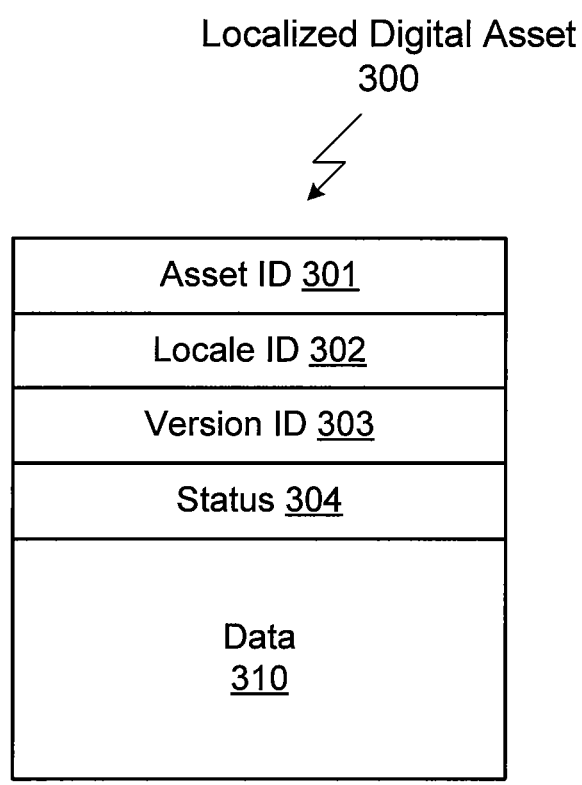
FIG. 3A is a more detailed view of a localized digital asset, according to one embodiment of the invention.

FIG. 3A is a more detailed view of a localized digital asset 300, according to one embodiment of the invention. Each localized digital asset 300 is associated with a unique asset identifier (ID) 301, a locale ID 302, a version ID 303, an status 304, and data 310. The locale ID 302 defines the locale for which the localized digital asset 300 is intended. For example, a text resource string may be translated into Spanish for two different locales, Spain and Mexico, each of which is associated with a different locale ID. The version ID 303 is associated with or labels a particular variation of the localized digital asset 300. Examples of version IDs include latest, approved, an alpha-numeric sequence, and the like. The status 304 indicates a level of a process flow that has been achieved for the localized digital asset 300. The process may be a review process or a development process that has been applied to the localized digital asset 300 to produce a result, e.g., pass/fail, red/green, staged, friends & family, and the like. For example, approval status levels may include alpha, beta, production release, and the like. The data 310 is data encoding the digital asset, e.g., text string, graphics, video, audio, and the like.

Figure 3B:
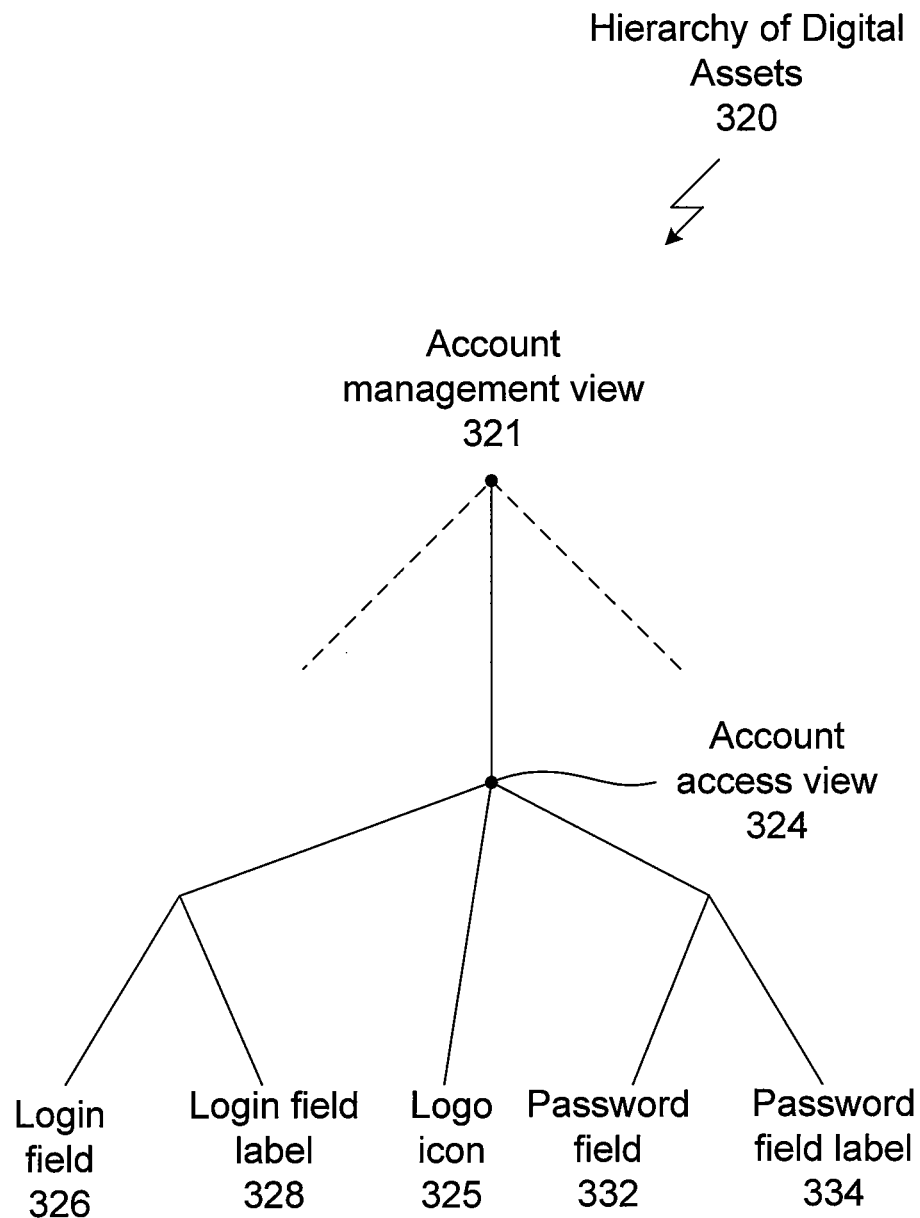
FIG. 3B is a hierarchy of digital assets, including localized digital assets, according to one embodiment of the invention.

FIG. 3B is a hierarchy of digital assets 320, including localized digital assets, according to one embodiment of the invention. The hierarchy of digital assets 320 is stored in a database and defines the relationship between the different digital assets. Over time, digital assets may be added, revised, or removed from a hierarchy of digital assets. The version ID for a particular digital asset in the hierarchy of digital assets 320 may be updated when the digital asset is revised. As shown in FIG. 3B, a webpage configured for managing an account, account management view 321 is a digital asset at a first node in the hierarchy of digital assets 320. The first node may be included within a larger system hierarchy. Included within the account management view 320 is an account access view 324 digital asset, which, in turn, includes digital assets of a login field 326, a login field label 328, a logo icon 325, a password field 332, and a password field label 334. One or more of the digital assets in the hierarchy of digital assets may be localized.

Figure 3C:
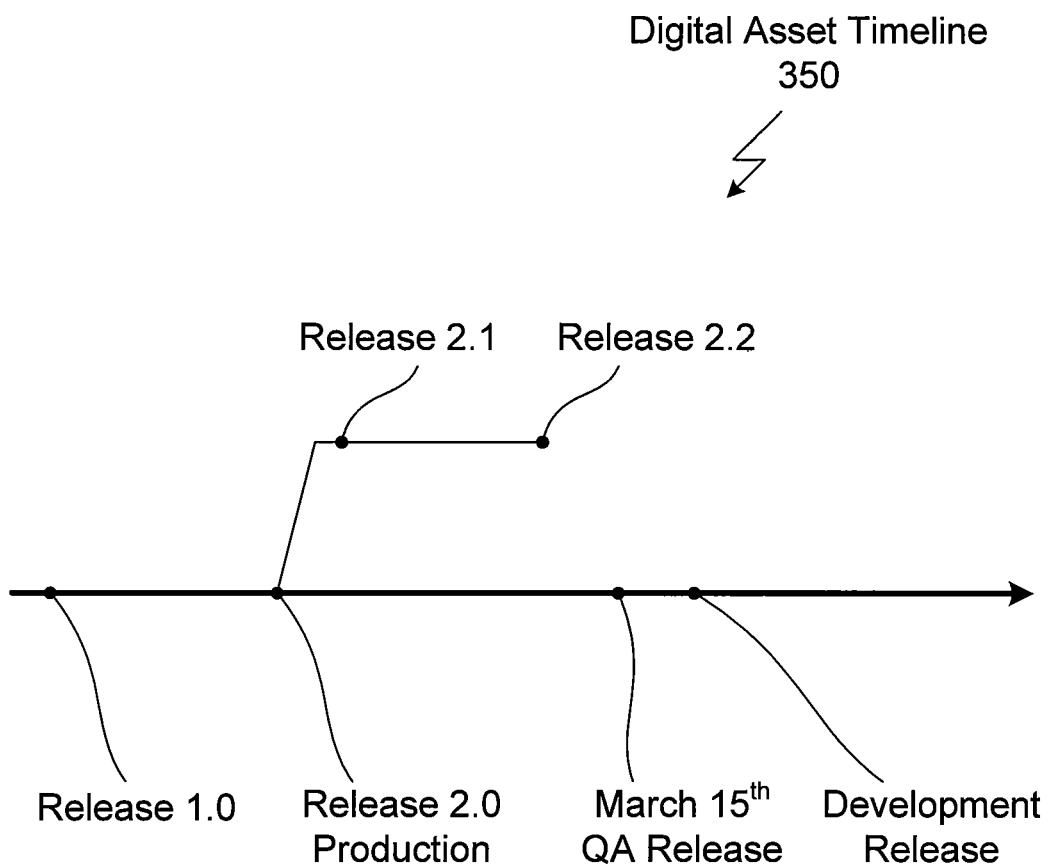
FIG. 3C is a digital asset release timeline with labels, according to one embodiment of the invention.

FIG. 3C is a digital asset timeline 350 with labels, according to one embodiment of the invention. Symbolic labels may be attached to different versions of the digital assets that are combined to dynamically generate the software system. As shown in FIG. 3C, several versions of one or more of the digital assets are labeled, e.g., release 1.0, release 2.0, QA release, and development release. The release 2.0 is also labeled "production" and the QA release is also labeled "March 15$^{th}$". The digital assets branched at release 2.0 and two additional versions that are labeled release 2.1 and release 2.2. Note, that the labels may be relocated from one version of the digital assets to a different version of the digital assets.

As previously explained, the dynamic context-based assembler 220 may be configured to compose digital content based on a context token. The context token defines assembly rules that may specify a version ID, a locale, and one or more exceptions for one or more digital assets or groups of subgroups of the digital assets within the digital content hierarchy. The dynamic context extraction engine 222 within the dynamic context-based assembler 220 extracts the specified localized digital asset IDs for the software system. When an exception is specified, the dynamic context extraction engine 222 replaces a digital asset with the digital asset specified by the exception to assemble the digital content according to the context token. To locate the specified digital asset, the dynamic context extraction engine 222 traverses the hierarchy of digital assets 320.

TABLE 1 illustrates examples of context tokens.

TABLE 1

Context token examples

| Exception | Locale | label |
|---|---|---|
| none | en_UK | Release 2.0 |
| none | es_MX | Release 2.0 |
| +1.23.44.236 | en_UK | QA Release |
| +1.23.44.242 | en_UK | March 15th |
| +1.23.45.233 | | |

In the first example no exceptions are specified for digital assets in the context token, the locale is United Kingdom (UK) English, and the software system is release 2.0. In the second example no exceptions are specified for digital assets in the context token, the locale is Mexico (MX) Spanish, and the software system is release 2.0. In the third example the software system is QA release and the locale is UK English. An exception is specified for the digital asset in the QA release that corresponds to asset identifier 1.23.44 and the digital asset having the asset ID of 1.23.44.236 is instantiated. When multiple digital assets correspond to the asset identifier 1.23.44 in the QA release, the digital asset having the locale ID of UK English is selected for instantiation. In the fourth example the software system is March 15$^{th}$ and the local is UK English. Two exceptions are specified for digital assets in the March 15$^{th}$ release, corresponding to asset identifiers 1.23.44 and 1.23.45. The digital assets having the asset IDs of 1.23.44.242 and 1.23.45.233, respectively, are instantiated.

The dynamic context-based assembler 220 composes digital content based on a context token received from a client device 108A, 108B, or 108C. The dynamic context-based assembler 220 also receives a client ID that identifies the client device 108A, 108B, or 108C. The dynamic context-based assembler 220 then transmits the digital content to the client device 108A, 108B, or 108C corresponding to the client ID. In this manner, a client may specify a particular variation of the digital content. Examples of digital content include an HTML webpage, a data package, an HTML5 web application, and the like. In some embodiments, the context token may not include a software system version because the software system version is determined by the dynamic context-based assembler 220 based on the client ID.

Figure 4:
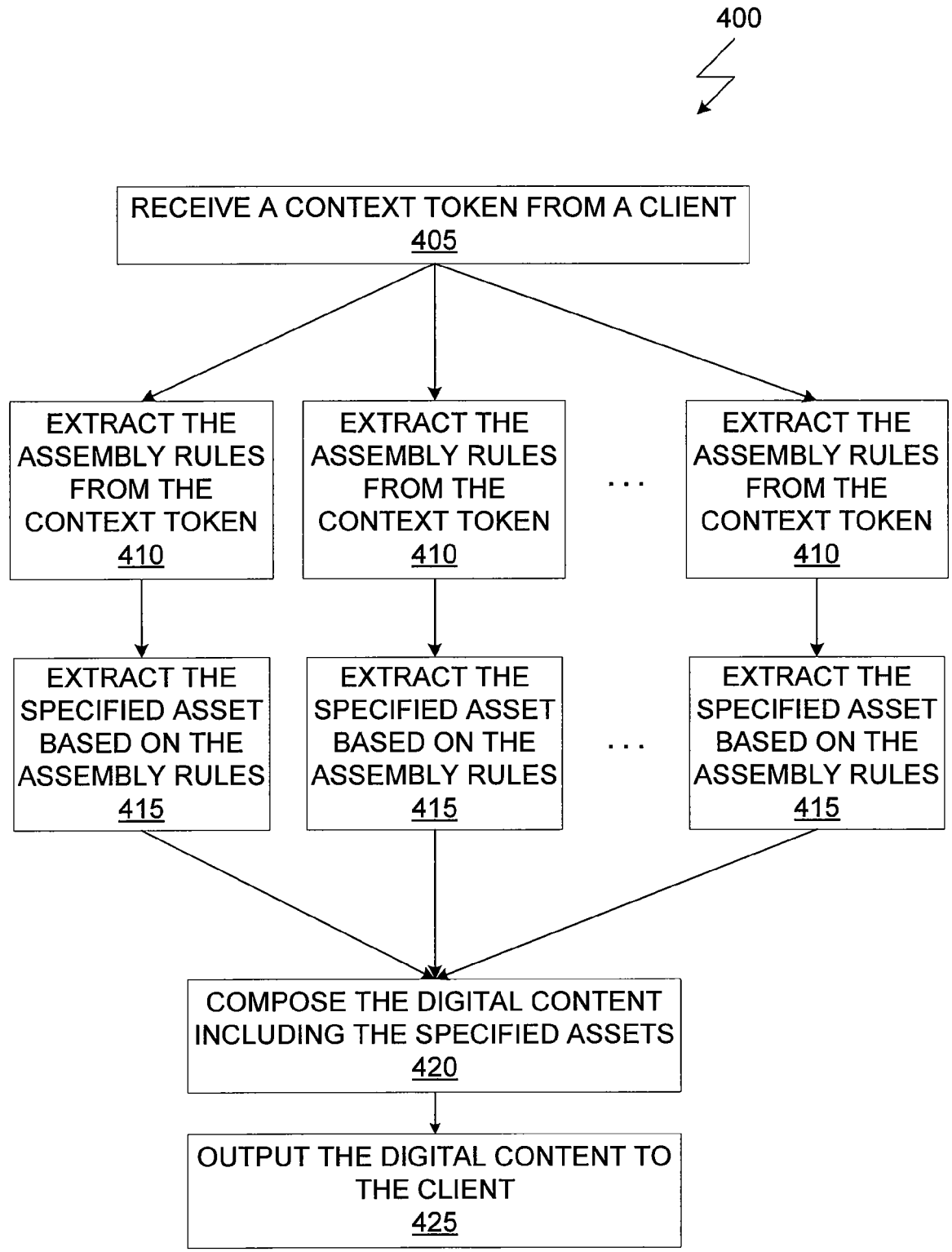
FIG. 4 illustrates a method for providing a client with a variation of digital assets based on a context token, according to one embodiment of the invention.

FIG. 4 illustrates a method 400 for providing a client device with a variation of digital content based on a context token, according to one embodiment of the invention. Although the method steps are described in conjunction with the systems of FIGS. 1 and 2, persons skilled in the art will understand that any system configured to perform the method steps, in any order, is within the scope of the invention. As shown, the method 400 begins at step 405 where the dynamic context-based assembler 220 receives a context token from a client device 108A, 108B, or 108C. The client device 108A, 108B, or 108C may also provide the dynamic context-based assembler 220 with a client ID.

At step 410, the dynamic context extraction engine 222 extracts the assembly rules from the context token. When more than one exception is specified, the dynamic context extraction engine 222 extracts the assembly rule for each exception in parallel as shown by the multiple copies of step 410. At step(s) 415, the dynamic context extraction engine 222 extracts each digital asset specified by an exception in the context token. At step 420, the dynamic context-based assembler 220 composes the digital content including the specified digital assets. At step 425, the dynamic context-based assembler 220 outputs the digital content to the client.

As described, different users may specify different context tokens to configure digital content that is tailored to their needs. This enables users, such as translators, to generate localized digital assets and view the localized digital assets in an application before storing the localized digital asset in the dynamic context-based assembler 220. Once the localized digital asset is stored in the dynamic context-based assembler 220 a QA engineer may test the localized digital asset by specifying an exception to include that asset in digital content. Advantageously, the QA engineer does not need to build the source code to view the localized digital asset in the application. The management of different software system versions is simplified and it is possible to update and track the approval status of localized digital assets, such as translated resource strings.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for assembling digital content, the method comprising:
receiving a context token and a client device identifier;
extracting, from the context token, an assembly rule specifying a localized digital asset, wherein the localized digital asset is based on a first subset of a dynamic database that is under test prior to release;
based on the assembly rule, locating the localized digital asset in the dynamic database;
assembling a variation of the digital content that instantiates the localized digital asset in the variation of the digital content; and
transmitting the variation of the digital content to a client device associated with the client device identifier.

2. The computer-implemented method of claim 1, further comprising traversing a hierarchy of digital assets to locate the localized digital asset.

3. The computer-implemented method of claim 1, wherein the localized digital asset is further based on a second subset of the dynamic database that includes a configuration status identifier indicating a level of a process flow that has been achieved, wherein the level achieved comprises one of an alpha release, a beta release, and a production release.

4. The method of claim 3 wherein the localized digital asset is further based on a third subset of the dynamic database that is suitable for general access.

5. The computer-implemented method of claim 1, wherein the localized digital asset comprises a graphics resource.

6. The computer-implemented method of claim 1, wherein the localized digital asset comprises a video resource.

7. The computer-implemented method of claim 1, wherein the localized digital asset comprises a text string resource.

8. The computer-implemented method of claim 1, wherein the localized digital asset comprises an audio resource.

9. The computer-implemented method of claim 1, further comprising, prior to assembling the variation of the digital content, determining that the client device is eligible to receive the variation of the digital content based on the client identifier.

10. A system, comprising:
a memory that includes an application configured to perform dynamic context-based assembly of digital assets; and
a processing unit coupled to the memory and configured to:
receive a context token and a client device identifier,
extract, from the context token, an assembly rule specifying a localized digital asset, wherein the localized digital asset is based on a first subset of a dynamic database that is under test prior to release,
based on the assembly rule, locate the localized digital asset in the dynamic database,
assemble a variation of the digital content that instantiates the localized digital asset in the variation of the digital content, and
transmit the variation of the digital content to a client device associated with the client device identifier.

11. A non-transitory computer-readable storage medium including instructions that, when executed by a processing unit, cause the processing unit to perform an operation for assembling a variation of digital content, the operation comprising:
receiving a context token and a client device identifier;
extracting, from the context token, an assembly rule specifying a replacement localized digital asset, wherein the localized digital asset is based on a first subset of a dynamic database that is under test prior to release;
based on the assembly rule, locating the localized digital asset in the dynamic database;
assembling a variation of the digital content that instantiates the localized digital asset in the variation of the digital content; and
transmitting the variation of the digital content to a client device associated with the client device identifier.

12. The computer-readable storage medium of claim 11, the operation further comprising traversing a hierarchy of digital assets to locate the localized digital asset.

13. The computer-readable storage medium of claim 11, wherein the localized digital asset is further based on a second subset of the dynamic database that includes a configuration status identifier indicating a level of a process flow that has been achieved, wherein the level achieved comprises one of an alpha release, a beta release, and a production release.

14. The computer-readable storage medium of claim 13, wherein the localized digital asset is further based on a third subset of the dynamic database that is suitable for general access.

15. The computer-readable storage medium of claim 11, wherein the localized digital asset comprises a graphics resource.

16. The computer-readable storage medium of claim 11, wherein the localized digital asset comprises a video resource.

17. The computer-readable storage medium of claim 11, wherein the localized digital asset comprises a text string resource.

18. The computer-readable storage medium of claim 11, wherein the localized digital asset comprises an audio resource.

19. The computer-readable storage medium of claim 11, further comprising, prior to assembling the variation of digital content, determining that the client device is eligible to receive the variation of the digital content source based on the client identifier.

20. The computer-readable storage medium of claim 11, wherein the localized digital asset comprises a translated variation of a digital asset corresponding to an asset identifier.

21. A computer-implemented method for assembling digital content, the method comprising:
- receiving a context token and a client device identifier;
- extracting, from the context token, an assembly rule specifying a localized digital asset;
- based on the assembly rule, locating the localized digital asset in a dynamic database;
- assembling a variation of the digital content that instantiates the localized digital asset in the variation of the digital content; and
- transmitting the variation of the digital content to a client device associated with the client device identifier;
- wherein the localized digital asset comprises a configuration status identifier indicating a level of a process flow that has been achieved, wherein the level achieved comprises one of an alpha release, a beta release, and a production release.

* * * * *